July 5, 1927.

C. HUNGERFORD

WATER FILTER

Filed Nov. 12, 1921

Inventor

CHURCHILL HUNGERFORD.

By A. V. [signature]

Attorney

July 5, 1927.
C. HUNGERFORD
WATER FILTER
Filed Nov. 12, 1921   2 Sheets-Sheet 2
1,634,783
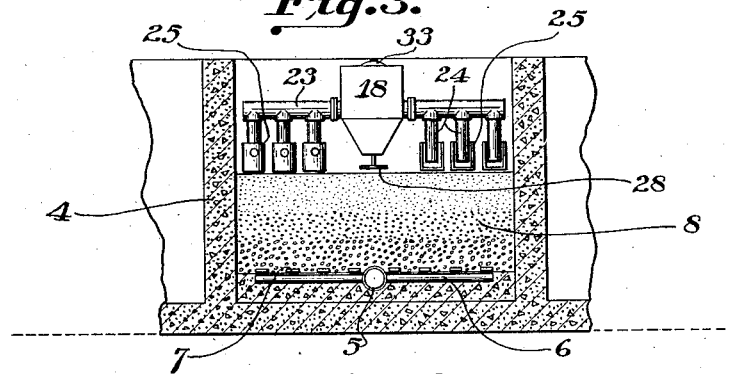
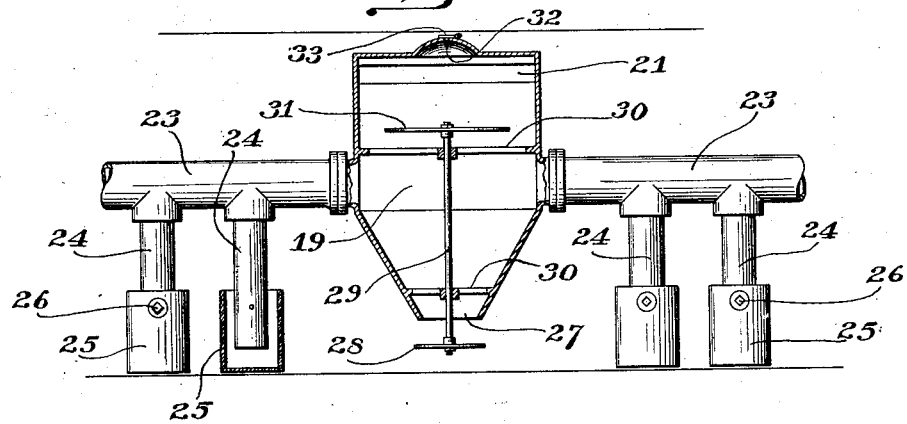
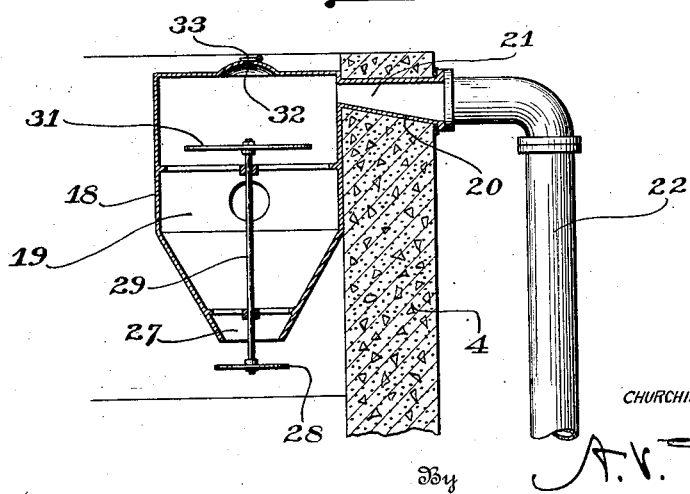
Inventor
CHURCHILL HUNGERFORD.
By
Attorney Patented July 5, 1927.

1,634,783

UNITED STATES PATENT OFFICE.

CHURCHHILL HUNGERFORD, OF WENONAH, NEW JERSEY.

WATER FILTER.

Application filed November 12, 1921. Serial No. 514,535.

This invention relates to improvements in water filters of the class employing a tank containing a bed of filtering material such as sand and gravel, suitably graded from the coarse particles thereof at the bottom of the bed to the fine particles thereof at the top of the bed, and provided with water passages or pipes through which water may flow to the top and from the bottom of the filter bed during the filtering operation, and through which water may flow to the bottom and from the top of the filter bed during the operation of washing or cleansing the filter bed.

During the washing or cleansing operation, the wash water is forced upwardly through the filter bed and to a level where it overflows into suitable troughs through which it continues to flow to and through the pipes or passages which direct it from the filter; and, during each washing operation, it is desired and intended that the wash water shall carry with it from the filter as much as possible of the impurities washed up out of the filter bed, without carrying from the filter the fine particles of sand which are raised above the normal level of the filter bed by the upwardly flowing wash water, either individually or agglomerated with the impurities.

In thus washing the filter, great difficulty has been experienced in causing the wash water to carry away the desired high percentage of the impurities retained by the filter bed during previous filtering operations without the loss of a considerable quantity of sand, because, when the overflow inlet openings of the wash water troughs are located a sufficient distance above the normal level of the filter bed to prevent the wash water from carrying the fine particles of sand to and through the inlet openings of the troughs, the openings are located too high above the normal sand level to permit the wash water to elevate the desired high percentage of the impurities to the openings. The particles of impurities conglomerate into masses of various sizes, some approximating and some exceeding the specific gravity of the sand and some forming large concretions of sand and mud known as mud balls which are difficult to remove by washing operations and which interfere very greatly with the efficient operation of the filter.

The object of my invention is to overcome the aforesaid difficulty, and I accomplish my object by and the invention resides in the provision of a filter having in the construction and organization of its parts a novel, simple and efficient means for thoroughly cleansing the filter bed in such manner as to wash out a very high percentage of the impurities with the loss of very little or practically no sand, as will be hereinafter fully described and particularly claimed.

In the accompanying drawings, illustrating my invention,

Figure 3 is a transverse section thereof, on line 3—3 of Fig. 2.

Figure 4 is a vertical section through the sand collecting chamber and including some of the pipes forming the water passages leading thereto.

Figure 5 is a vertical section through the sand collecting chamber and the adjacent wall of the tank, showing the wash water pipe leading from the chamber.

Figure 1:
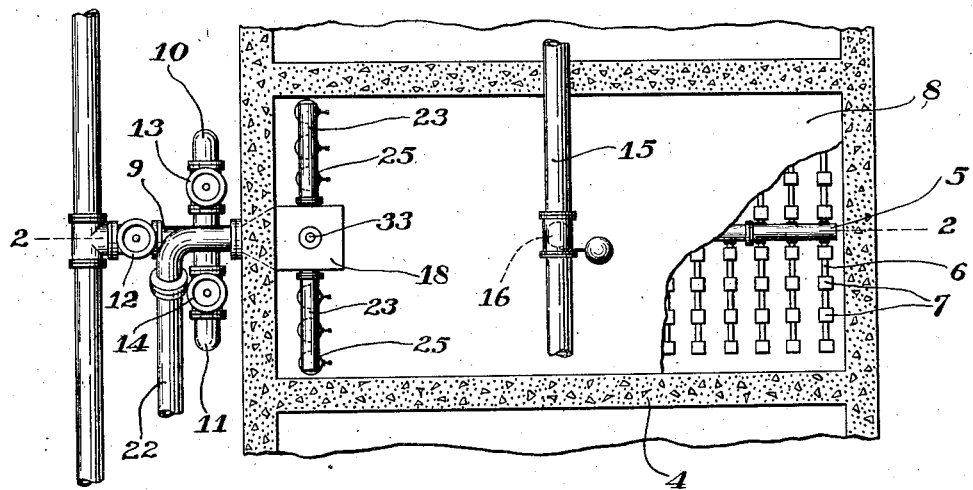
Figure 1 is a top view of a filter showing one form of embodiment of my invention.
Figure 2:
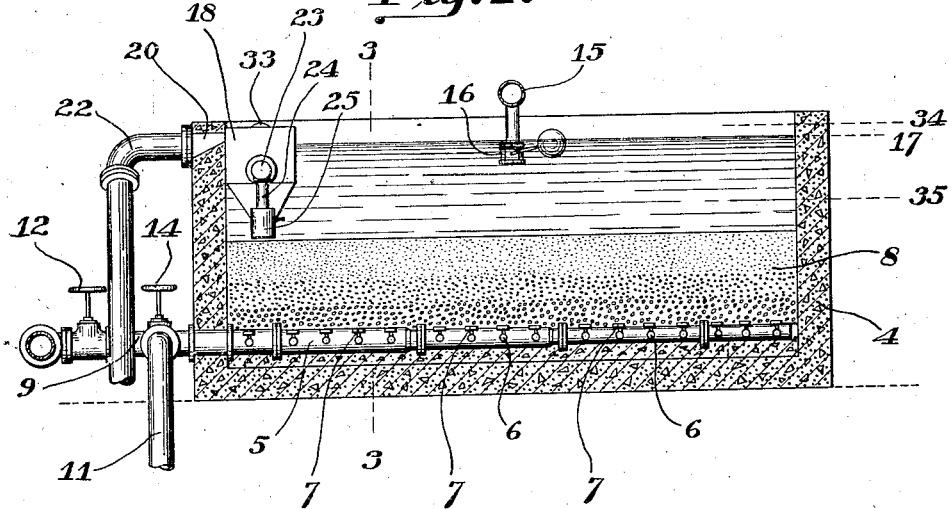
Figure 2 is a longitudinal section through the same, on line 2—2 of Fig. 1.

Referring to the drawings, 4 designates a tank which may be of any suitable shape and size for its intended purpose.

Supported upon the bottom of the tank 4 is a pipe 5 which extends outwardly through one end wall of the tank and forms the outlet passage for the filtered water which reaches the pipe 5 through small branch pipes 6 extending from the pipe 5 and distributed over the bottom of the tank and having numerous inlets controlled by suitable valves 7 which permit the filtered water to enter the pipes 6 and prevent the particles of sand of the filter bed 8 from entering the pipes 6. These valves 7 permit the wash water to flow from the pipes 6 during the filter washing operation, hereinafter described.

The pipe 5 extends outwardly from the tank 4 and it is provided with three branches 9, 10 and 11, controlled by valves 12, 13 and 14, respectively. The branch 11 is provided to conduct the filtered water from the filter to a desired location or receiver for use, when the valves 12 and 13 are closed; the branch 10 is for waste filtered water to pass to a suitable point of discharge, when the valves 12 and 14 are closed; and the branch 9 is for the supply of wash water to the filter for cleansing or washing purposes when the valves 13 and 14 are closed.

The tank 4 contains the bed 8 of filtering material which rests upon the pipes 5 and 6 and valves 7 and which is composed of sand and gravel with the sand at the top of the bed and having a normal level some distance below the top of the tank.

The water to be filtered is supplied to the tank above the filter bed 8 through a pipe 15 having a float controlled valve 16 which prevents water from flowing from the pipe 15, to the tank 4 after the water delivered to the tank reaches a predetermined level therein, indicated by the line 17.

When the valves 12 and 13 are closed and the valve 14 is open and water is supplied to the tank 4 through the pipe 15, the water passes down through the filter bed 8 which removes the impurities therefrom and the pure or filtered water then passes from the filter through the valves 7 and pipes 6, 5 and 11.

The construction and operation of the parts thus far described are well known to persons skilled in this art, and, therefore, no further description thereof is deemed necessary herein.

Supported within the tank 4, at one end thereof, above the filter bed 8 therein, is a frame or casing 18 enclosing a chamber 19 and having an extension 20 extending through and embedded in the wall of the tank 4 and forming a passage 21 communicating with the chamber 19 and leading to the exterior of the tank 4. Secured to the outer end of the extension 20 is a pipe 22 which extends outwardly and downwardly therefrom and forms a continuation of the passage 21 enclosed thereby.

The frame or casing 18 is provided with oppositely-extending, horizontal pipes 23 the inner ends of which communicate with the chamber 19 and the outer ends of which are closed. Each pipe 23 has limbs or branch pipes 24 extending downwardly therefrom and carrying cups 25 which surround and enclose the lower ends thereof and which are held in place thereon by set screws 26 screwed into and through the cups 25 and engaging the pipes 24 in a manner to permit the cups to be adjusted vertically relatively to the pipes 24.

The lower ends of the pipes 24 are open and spaced above the bottoms of the cups 25, and the vertical walls of the cups surround the pipes 24 in spaced relation thereto and thereby form water passages which extend downwardly through the cups exteriorly of the pipes 24 and then upwardly through the pipes 24 to the pipes 23, the inlet openings to said passages being formed by and between the upper ends of the cups 25 and the enclosed pipes 24. The passages thus formed continue through the horizontal pipes 23 to and through the chamber 19 of the frame or casing 18 and out through its extension 20 and through the pipe 22 which extends downwardly some distance below the level of the filter bed 8 and thereby forms a siphon which, when started, will draw water from within the tank 4 until the level of the water is lowered to the upper ends of the cups 25, whereupon the siphoning of the water will be arrested by the entrance of air into the cups, for a purpose hereinafter explained.

The chamber 19 formed by the casing 18 is adapted to collect sand, as will hereinafter appear, and the bottom of the casing 18 is provided with an opening 27 located above the filter bed 8 to permit the sand collected by the chamber to be discharged therefrom by gravity. A valve plate or disc 28 is provided to close the opening 27 under certain conditions, and the valve 28 is carried by a stem 29 which is fitted to slide vertically in bearings carried by spiders 30 within the chamber 19. The upper end of the stem 29 carries a horizontal baffle plate or disc 31 within the central portion of the chamber 19 above the pipes 23 to be acted upon by water flowing upwardly through the chamber 19 to raise and close the valve 28. The valve 28 rests normally in the lowered or open position shown in the drawings, and returns thereto by gravity when the flowing water ceases to hold the valve in the closed position.

The top wall of the casing 18 is provided with an air outlet opening 32 covered by a suitable flap valve 33 to prevent air from entering the same.

I shall now describe the operation of washing or cleansing from the filter bed the impurities retained thereby during a previous filtering operation.

Following the filtering operation, the valve 14 is closed and the valve 12 is opened, permitting the wash water to enter the filter through the pipe 9 and through the pipe 5. The wash water is fed to and through the pipe 9 in the usual manner common to filters of this class, under a predetermined pressure. The wash water passes through the pipe 5 and its branches 6 and through the valves 7 into the bottom of the filter bed 8. From the valves 7 the water rises through the filter bed to and above the top or level thereof. As the level of the rising wash water passes the tops of the cups 25, the water overflows the same and passes down into the cups and up through the pipes 24, and thereafter the level of the rising water moves upwardly within the pipes 24 and 23 and chamber 19 the same as it does exteriorly thereof until the rising water flows outwardly from the chamber 19 and into and downwardly through the pipe 22, starting the operation of the siphon of which the pipe 22 forms a part, as hereinbefore explained. When the operation of the siphon is thus started the water flowing upwardly through the chamber 19 acts against the bottom of the baffle plate 31 and raises it and thereby automatically closes the valve 28 and holds it in the closed position until the siphon ceases to operate and permits the valve 28 to automatically open by gravity. The speed of the water drawn from within the tank 4 by the siphon is controlled by the length of the pipe 22, and the parts of the entire apparatus are proportioned so that the wash water entering the tank 4 from the pipe 9 will be exceeded in volume by the water leaving the tank through the pipe 22. Therefore the siphon, drawing the water from the tank 4, will lower the water level within the tank from approximately the line 34 to approximately the line 35. When the water level is thus lowered to the line 35, air will be permitted to enter the cups 25, thereby destroying the action of the siphon. Then the incoming wash water again will raise the water level within the tank to approximately the line 34 and again start the operation of the siphon which will draw the water from the tank until the water level is again lowered to approximately the level 35 and the action of the siphon is again destroyed, and so on the water level within the tank 4 is raised and lowered between the lines 34 and 35 so long as the wash water is permitted to flow to the bottom of the filter bed through the pipe 5.

As the water flows upwardly through the filter bed 8, during the washing operation, it washes upwardly from within and upon the bed the impurities and the conglomerated masses thereof collected and retained thereby during a previous filtering operation. These impurities are carried by the wash water into the cups 25 and out through the siphon. The relation of the level of the tops of the cups 25 to the level of the filter bed 8 is such that the ascending water raises or elevates the impurities sufficiently to carry them into the cups 25 even though some particles of sand from the filter bed are also carried into the cups. The particles of sand thus entering the cups 25 are carried by the water through the cups and through the pipes 24 and 23 to the chamber 19 where the velocity of the water is reduced, due to the enlarged area of the chamber, sufficiently to permit the particles of sand to settle to the bottom of the chamber while the lighter particles of the impurities are carried on out through the siphon. At the conclusion of each water discharging action of the siphon, the valve 28 opens and the sand collected by the chamber 19 is returned by gravity through the opening 27 to the filter bed 8.

Each time the siphon operates to discharge a quantity of wash water from the tank 4, the conglomerated masses of impurities and the mud balls or concretions of sand and mud are rolled or swept over the top of the filter bed 8 to the cups 25, as the descending water level approaches the level of the tops of the cups 25, thereby breaking up such conglomerated masses and mud balls into pieces of lighter specific gravity, liberating particles of sand carried thereby and permitting the lighter particles of the impurities to be carried to the cups 25 and to enter the same while the liberated particles of sand return to the filter bed. Thereafter the impurities are still further broken up by contact with the walls of the passage forming the siphon and by the action of the wash water in traversing the sinuous courses of the siphon passages, thereby further reducing the specific gravity of the impurities and liberating additional particles of sand which are arrested and retained by the chamber 19, subsequently to be returned to the filter bed by the opening of the valve 28, as previously explained.

The velocity of the water flowing over the filter bed 8 toward the cups 25 increases as the level of the water is lowered toward the line 35, during each operation of the siphon, causing a rapid flow of the water over the filter bed as the water level nears the line 35, and this rapid flow of the water aids greatly in the thorough washing of the filter by breaking up the mud balls and masses of impurities and carrying them toward the cups 25.

The wash water is permitted to flow to and through the filter bed 8 and the siphon until all or substantially all the impurities have been washed out through the siphon. The valve 12 is then closed, the valve 13 is opened and the water to be filtered is again permitted to flow into the tank 4 through the pipe 15 and down through the filter bed 8 and out through the pipe 10 for a limited time or until there is no trace of impurities in the water, whereupon the valve 13 is closed and the valve 14 is opened to permit the filtered water to pass out through the pipe 11 for use. This filtering operation is continued until the filter bed 8 is again fouled by impurities, and thereafter the filter is again washed or cleansed as previously described.

I claim:—

1. In a filter and in combination, a tank, a sand bed therein, means to feed wash water to the tank and the sand bed below the normal level of the latter, and walls forming a wash water passage leading from the interior of the tank and having a water inlet opening within the tank and above the normal sand level, said passage including a sand collecting chamber and a part connecting it to said opening and being of less area than the area of the chamber, whereby the velocity of the wash water will be reduced as it passes through the chamber.

2. In a filter and in combination, a tank, a sand bed therein, means to feed wash water to the tank and the sand bed below the normal level of the latter, and walls forming a wash water passage leading from the interior of the tank and having a water inlet opening within the tank and above the normal sand level, said passage including a sand collecting chamber and a part connecting it to said opening and being of less area than the area of the chamber, whereby the velocity of the wash water will be reduced as it passes through the chamber, and the wall of the lower portion of the chamber having an opening permitting sand to be discharged from the chambr to the tank.

3. In a filter and in combination, a tank, a sand bed therein, means to feed wash water to the tank and the sand bed below the normal level of the latter, walls forming a wash water passage leading from the interior of the tank and having a water inlet opening within the tank and above the normal sand level, said passage including a sand collecting chamber and a part connecting it to said opening and being of less area than the area of the chamber, whereby the velocity of the wash water will be reduced as it passes through the chamber, the wall of the lower portion of the chamber having an opening permitting sand to be discharged from the chamber to the tank, and a normally open valve controlling the opening in the chamber and provided with means to automatically close the same when water is caused to flow through the chamber.

4. In a filter and in combination, a tank, a sand bed therein, means to feed wash water to the tank and the sand bed below the normal level of the latter, walls forming a wash water passage leading from the interior of the tank to the exterior thereof and having a water inlet opening within the tank and above the normal sand level, said passage including a sand collecting chamber and a part connecting it to said opening and being of less area than the area of the chamber, whereby the velocity of the wash water will be reduced as it passes through the chamber, the wall of the lower portion of the chamber having an opening permitting sand to be discharged from the chamber to the tank, a normally open valve controlling the opening in the wall of the chamber, a baffle plate within said passage and adapted to be moved by water passing therethrough, and means operated by said plate when moved to close said valve.

5. In a filter and in combination, a tank, a sand bed therein, means to feed wash water to the tank and the sand bed below the normal level of the latter, walls forming a wash water passage leading from the interior of the tank to the exterior thereof and having a water inlet opening within the tank and above the normal sand level, said passage including a sand collecting chamber and a part connecting it to said opening and being of less area than the area of the chamber, whereby the velocity of the wash water will be reduced as it passes through the chamber, the wall of the lower portion of the chamber having an opening permitting sand to be discharged from the chamber to the tank, a normally open valve controlling the opening in the wall of the chamber and provided with a stem guided to slide vertically in said passage, and a baffle plate carried by said stem within said passage and adapted to be moved by water passing therethrough and thereby close said valve.

6. In a filter and in combination, a tank, a sand bed therein, means to feed wash water to the tank and the sand bed below the normal level of the latter, and walls forming a wash water passage leading from the interior of the tank to the exterior thereof and having a water inlet opening within the tank and above the normal sand level, said passage including a sand collecting chamber and a part connecting it to said opening and being of less area than the area of the chamber, whereby the velocity of the wash water will be reduced as it passes through the chamber, said passage extending downwardly from said inlet opening and then upwardly before reaching said chamber.

7. In a filter and in combination, a tank, a sand bed therein, means to feed wash water to the tank and the sand bed below the normal level of the latter, a sand collector having a sand collecting chamber, a pipe communicating with said chamber and extending outwardly therefrom and having a downwardly extending limb provided with an open lower end, the passage formed by the pipe being of less area than the area of the chamber, and a cup surrounding the lower end portion of said limb in spaced relation thereto and forming a water inlet between its upper end and the outer wall of said limb above the normal sand level, said collector having a water discharging passage leading therefrom above said pipe.

8. In a filter and in combination, a tank, a sand bed therein, means to feed wash water to the tank and the sand bed below the normal level of the latter, walls forming a water passage including a vertically extending pipe located within the tank and having an open lower end above the normal sand level and constituting the inlet opening of the passage, and a cup surrounding the lower end portion of the pipe in spaced relation thereto and forming a water inlet between its upper end and the outer wall of the pipe above the open lower end of the pipe, said passage extending above said water inlet and leading to the exterior of the tank.

9. In a filter and in combination, a tank, a sand bed therein, means to feed wash water to the tank and the sand bed below the normal level of the latter, walls forming a wash water passage leading from the interior of the tank to the exterior thereof and having a water inlet opening within the tank and above the normal sand level, said passage including a siphon below the top of the tank, said passage including a sand collecting chamber between said opening and the top of the siphon, and the portion of the passage between said opening and said chamber being of less area than the chamber, whereby the velocity of the wash water will be reduced as it passes through the chamber.

10. In a filter and in combination, a tank, a sand bed therein, means to feed wash water to the tank and the sand bed below the normal level of the latter, walls forming a wash water passage leading from the interior of the tank to the exterior thereof and having a water inlet opening within the tank and above the normal said level, said passage including a siphon the top of which is located below the top of the tank, said passage including a sand collecting chamber between said opening and the top of the siphon, the portion of the passage between said opening and said chamber being of less area than the chamber, whereby the velocity of the wash water will be reduced as it passes through the chamber, and the wall of the lower portion of the chamber having an opening permitting sand to be discharged from the chamber to the tank.

11. In a filter and in combination, a tank, a sand bed therein, means to feed wash water to the tank and the sand bed below the normal level of the latter, walls forming a wash water passage leading from the interior of the tank to the exterior thereof and having a water inlet opening within the tank and above the normal sand level, said passage including a siphon the top of which is located below the top of the tank, said passage including a sand collecting chamber between said opening and the top of the siphon, the portion of the passage between said opening and said chamber being of less area than the chamber, whereby the velocity of the wash water will be reduced as it passes through the chamber, the wall of the lower portion of the chamber having an opening permitting said to be discharged from the chamber to the tank, and a normally open valve controlling the opening in the chamber and provided with means to automatically close the same when water is caused to flow through the chamber.

12. In a filter and in combination, a tank, a sand bed therein, means to feed wash water to the tank and the sand bed below the normal level of the latter, walls forming a wash water passage leading from the interior of the tank to the exterior thereof and having a water inlet opening within the tank and above the normal sand level, said passage including a siphon the top of which is located below the top of the tank, said passage including a sand collecting chamber between said opening and the top of the siphon, the portion of the passage between said opening and said chamber being of less area than the chamber, whereby the velocity of the wash water will be reduced as it passes through the chamber, the wall of the lower portion of the chamber having an opening permitting sand to be discharged from the chamber to the tank, a normally open valve controlling the opening in the wall of the chamber, a baffle plate within said passage and adapted to be moved by water passing therethrough, and means operated by said plate when moved to close said valve.

13. In a filter and in combination, a tank, a sand bed therein, means to feed wash water to the tank and the sand bed below the normal level of the latter, walls forming a water passage including a vertically extending pipe located within the tank and having an open lower end above the normal sand level and constituting the inlet opening of the passage, and a cup surrounding the lower end portion of the pipe in spaced relation thereto and forming a water inlet between its upper end and the outer wall of the pipe above the open lower end of the pipe, said passage leading to the exterior of the tank and including a siphon extending above said water inlet and having its upper end located below the top of the tank.

In testimony whereof I affix my signature hereto.

CHURCHILL HUNGERFORD.